US012603765B2

(12) United States Patent
Polychroniadou et al.

(10) Patent No.: US 12,603,765 B2
(45) Date of Patent: Apr. 14, 2026

(54) METHOD AND SYSTEM FOR PRIVACY-PRESERVING LINEAR OPTIMIZATION

(71) Applicant: JPMorgan Chase Bank, N.A., New York, NY (US)

(72) Inventors: Antigoni Ourania Polychroniadou, New York, NY (US); Tucker Richard Balch, Suwanee, GA (US); Yue Guo, Jersey City, NJ (US); Daniel Esteban Escudero Ospina, Long Island City, NY (US); Chenkai Weng, Evanston, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 6 days.

(21) Appl. No.: 18/602,798

(22) Filed: Mar. 12, 2024

(65) Prior Publication Data

US 2025/0279882 A1 Sep. 4, 2025

(30) Foreign Application Priority Data

Mar. 4, 2024 (GR) .............................. 20240100154

(51) Int. Cl.
*H04L 9/08* (2006.01)
*G06Q 40/06* (2012.01)

(52) U.S. Cl.
CPC ............. *H04L 9/085* (2013.01); *G06Q 40/06* (2013.01)

(58) Field of Classification Search
None
See application file for complete search history.

(56) References Cited

U.S. PATENT DOCUMENTS

| | | | |
|---|---|---|---|
| 2009/0019284 A1* | 1/2009 | Cho ...................... | H04L 9/3273 713/170 |
| 2009/0150281 A1* | 6/2009 | Ellis ....................... | G06Q 40/00 705/37 |
| 2011/0153521 A1* | 6/2011 | Green .................... | G06Q 40/06 705/36 R |

(Continued)

OTHER PUBLICATIONS

Linear Programming, Posted at https://www.cuemath.com/algebra/linear-programming/ on Jun. 19, 2022 (Year: 2022).*

*Primary Examiner* — Scott B Christensen
(74) *Attorney, Agent, or Firm* — Greenblum & Bernstein, P.L.C.

(57) ABSTRACT

A method for using a privacy preserving linear optimization technique to perform computations on encrypted data while ensuring that the original data remains confidential and secure from any unauthorized access based on secure multiparty computation is provided. The method includes: receiving, from each of several entities, a respective input that includes encrypted data; constructing a table that includes first information that relates to an objective function, second information that relates to a boundary value, and third information that relates to a polynomial function that is applicable to each respective input; and determining a value that maximizes the polynomial function subject to a constraint that a result of applying the objective function to the value is less than or equal to the boundary value.

17 Claims, 5 Drawing Sheets

400

Receive Inputs with Encrypted Data from Participants S402

Construct Table Based on Objective Function, Boundary Value, and Polynomial Function S404

Determine Pivot Column and Pivot Row of Table S406

Update Pivot Row Based on Polynomial Function and Boundary Value S408

Update Pivot Column Based on Polynomial Function and Boundary Value and Updated Pivot Row S410

Determine Value that Maximizes Boundary Function Subject to Boundary Value Constraint S412

Calculate Risk Metric S414

(56) References Cited

U.S. PATENT DOCUMENTS

| | | | |
|---|---|---|---|
| 2013/0211990 A1* | 8/2013 | Zhong | G06Q 40/06 |
| | | | 705/37 |
| 2016/0283738 A1* | 9/2016 | Wang | G06N 20/00 |
| 2022/0076333 A1* | 3/2022 | Thornberg | G06Q 40/06 |
| 2022/0101438 A1* | 3/2022 | Gao | G06Q 30/0201 |
| 2024/0275577 A1* | 8/2024 | Drucker | H04L 9/008 |

* cited by examiner

400

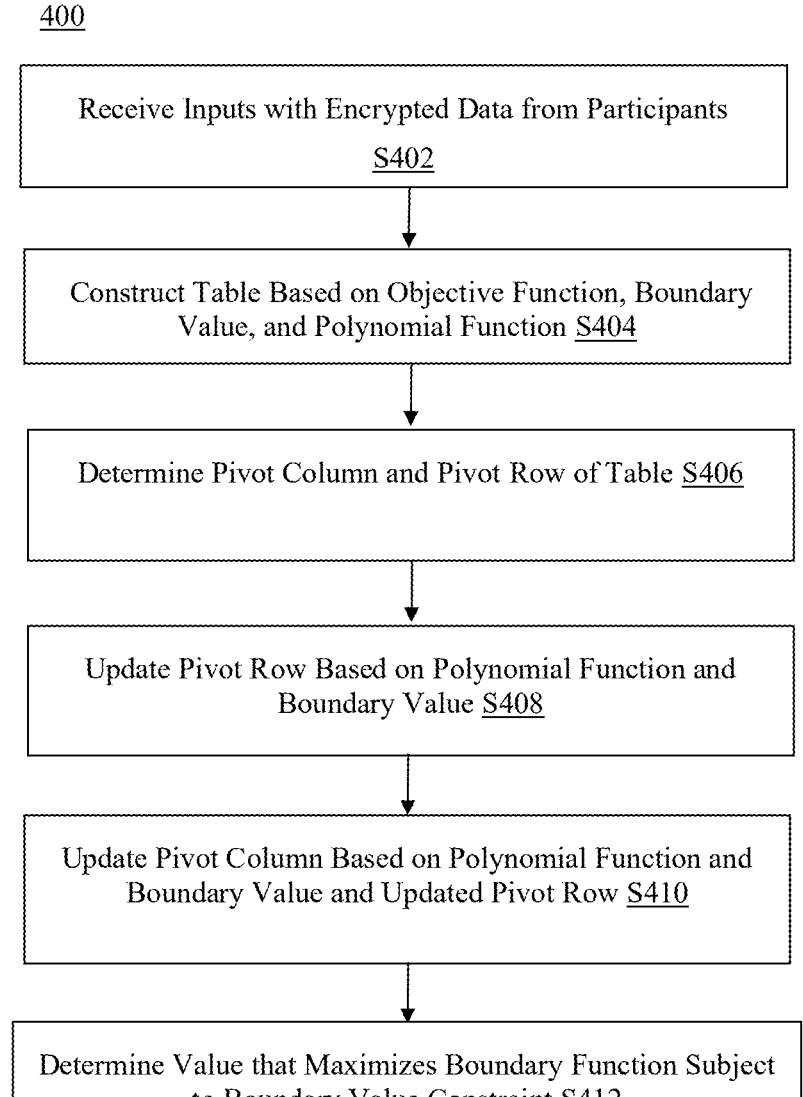

Receive Inputs with Encrypted Data from Participants
S402

Construct Table Based on Objective Function, Boundary
Value, and Polynomial Function S404

Determine Pivot Column and Pivot Row of Table S406

Update Pivot Row Based on Polynomial Function and
Boundary Value S408

Update Pivot Column Based on Polynomial Function and
Boundary Value and Updated Pivot Row S410

Determine Value that Maximizes Boundary Function Subject
to Boundary Value Constraint S412

Calculate Risk Metric S414

METHOD AND SYSTEM FOR PRIVACY-PRESERVING LINEAR OPTIMIZATION

CROSS-REFERENCE TO RELATED APPLICATIONS

This application claims priority benefit from Greek application Ser. No. 20240100154, filed Mar. 4, 2024, which is hereby incorporated by reference in its entirety.

BACKGROUND

1. Field of the Disclosure

This technology generally relates to privacy-preserving linear optimization techniques, and more particularly to a method and a system for using a privacy-preserving linear optimization technique to perform computations on encrypted data while ensuring that the original data remains confidential and secure from any unauthorized access based on secure multi-party computation.

2. Background Information

In the era of big data and advanced machine learning algorithms, privacy concerns have become paramount in various domains, particularly in finance where sensitive information is involved. Privacy Preserving Optimization (PPO) emerges as a promising approach to protect individuals' sensitive data while enabling data-driven decision-making.

Portfolio optimization is a critical financial problem, involving the allocation of assets to achieve an optimal balance of risk and return. However, conventional portfolio optimization techniques often require access to sensitive financial data, thereby raising privacy concerns. By applying privacy-preserving techniques, it becomes possible for investors to collaborate and optimize their portfolios without sharing raw financial data.

Accordingly, there is a need for a mechanism for using a privacy-preserving linear optimization technique to perform computations on encrypted data while ensuring that the original data remains confidential and secure from any unauthorized access based on secure multi-party computation.

SUMMARY

The present disclosure, through one or more of its various aspects, embodiments, and/or specific features or sub-components, provides, inter alia, various systems, servers, devices, methods, media, programs, and platforms for using a privacy-preserving linear optimization technique to perform computations on encrypted data while ensuring that the original data remains confidential and secure from any unauthorized access based on secure multi-party computation.

According to an aspect of the present disclosure, a method for using a privacy-preserving linear optimization technique to perform computations on encrypted data while ensuring that the original data remains confidential and secure from any unauthorized access is provided. The method is implemented by at least one processor. The method includes: receiving, by the at least one processor from each respective entity from among a plurality of entities, a respective input that includes first encrypted data; constructing, by the at least one processor, a first table that includes first information that relates to a first predetermined objective function, second information that relates to a first predetermined boundary value, and third information that relates to a predetermined polynomial function that is applicable to each respective input; and determining, by the at least one processor, a first value that maximizes the predetermined polynomial function subject to a constraint that a result of applying the first predetermined objective function to the first value is less than or equal to the first predetermined boundary value.

The determining of the first value may include: determining, by the at least one processor, a pivot column of the first table based on the received respective inputs; determining, by the at least one processor, a pivot row of the first table based on the received respective inputs and the pivot column; updating, by the at least one processor, the pivot row by performing a first predetermined operation that is based on the first predetermined polynomial polynomial function and the first predetermined boundary value; and updating, by the at least one processor, each respective column of the first table by performing a second predetermined operation that is based on the first predetermined function, the first predetermined boundary value, and the updated pivot row.

The determining of the pivot column may include: applying a predetermined minimum element function to each respective column of the first table; computing a most significant bit of a respective vector that corresponds to each respective column of the first table; reconstructing an encrypted value with respect to the most significant bit; and determining the pivot column based on a result of the reconstructing of the encrypted value.

The determining of the pivot row may include: retrieving elements of the pivot column; constructing a vector of tuples based on the elements of the pivot column; applying a predetermined positive minimum function to the vector of tuples; and determining the pivot row based on a result of the applying of the predetermined positive minimum function to the vector of tuples.

The first predetermined operation may include a predetermined table-set function that updates respective elements from the first table on an element-by-element basis.

The second predetermined operation may include the predetermined table-set function and a predetermined truncation function that truncates an authenticated sharing of each respective input by a predetermined number of bits.

Each respective entity may correspond to a financial portfolio that is associated with a respective client.

The method may further include calculating a market netting metric that relates to a respective degree of risk to a privacy associated with each respective financial portfolio. The market netting metric may include at least one from among a first metric that relates to an allocation of exposure of each respective entity, a second metric that relates to an amount of funds that are required with respect to at least one entity from among the plurality of entities, and a third metric that relates to a number of shares associated with at least one entity from among the plurality of entities.

According to another aspect of the present disclosure, a computing apparatus for using a privacy preserving linear optimization technique to perform computations on encrypted data while ensuring that original data remains confidential and secure from unauthorized access is provided. The computing apparatus includes a processor; a memory; and a communication interface coupled to each of the processor and the memory. The processor is configured to: receive, via the communication interface from each respective entity from among a plurality of entities, a respective input that includes first encrypted data; construct a first table that includes first information that relates to a first predetermined objective function, second information that relates to a first predetermined boundary value, and third information that relates to a predetermined polynomial function that is applicable to each respective input; and determine a first value that maximizes the predetermined polynomial function subject to a constraint that a result of applying the first predetermined objective function to the first value is less than or equal to the first predetermined boundary value.

The processor may be further configured to determine the first value by: determining a pivot column of the first table based on the received respective inputs; determining a pivot row of the first table based on the received respective inputs and the pivot column; updating the pivot row by performing a first predetermined operation that is based on the first predetermined polynomial function and the first predetermined boundary value; and updating each respective column of the first table by performing a second predetermined operation that is based on the first predetermined polynomial function, the first predetermined boundary value, and the updated pivot row.

The processor may be further configured to determine the pivot column by: applying a predetermined minimum element function to each respective column of the first table; computing a most significant bit of a respective vector that corresponds to each respective column of the first table; reconstructing an encrypted value with respect to the most significant bit; and determining the pivot column based on a result of the reconstruction of the encrypted value.

The processor may be further configured to determine the pivot row by: retrieving elements of the pivot column; constructing a vector of tuples based on the elements of the pivot column; applying a predetermined positive minimum function to the vector of tuples; and determining the pivot row based on a result of the applying of the predetermined positive minimum function to the vector of tuples.

The first predetermined operation may include a predetermined table-set function that updates respective elements from the first table on an element-by-element basis.

The second predetermined operation may include the predetermined table-set function and a predetermined truncation function that truncates an authenticated sharing of each respective input by a predetermined number of bits.

Each respective entity may correspond to a financial portfolio that is associated with a respective client.

The processor may be further configured to calculate a market netting metric that relates to a respective degree of risk to a privacy associated with each respective financial portfolio. The market netting metric may include at least one from among a first metric that relates to an allocation of exposure of each respective entity, a second metric that relates to an amount of funds that are required with respect to at least one entity from among the plurality of entities, and a third metric that relates to a number of shares associated with at least one entity from among the plurality of entities.

According to yet another aspect of the present disclosure, a non-transitory computer readable storage medium storing instructions for using a privacy preserving linear optimization technique to perform computations on encrypted data while ensuring that original data remains confidential and secure from unauthorized access is provided. The storage medium includes executable code which, when executed by a processor, causes the processor to: receive, from each respective entity from among a plurality of entities, a respective input that includes first encrypted data; construct a first table that includes first information that relates to a first predetermined objective function, second information that relates to a first predetermined boundary value, and third information that relates to a predetermined polynomial function that is applicable to each respective input; and determine a first value that maximizes the predetermined polynomial function subject to a constraint that a result of applying the first predetermined objective function to the first value is less than or equal to the first predetermined boundary value.

When executed by the processor, the executable code may further cause the processor to determine the first value by: determining a pivot column of the first table based on the received respective inputs; determining a pivot row of the first table based on the received respective inputs and the pivot column; updating the pivot row by performing a first predetermined operation that is based on the first predetermined polynomial function and the first predetermined boundary value; and updating each respective column of the first table by performing a second predetermined operation that is based on the first predetermined polynomial function, the first predetermined boundary value, and the updated pivot row.

When executed by the processor, the executable code may further cause the processor to determine the pivot column by: applying a predetermined minimum element function to each respective column of the first table; computing a most significant bit of a respective vector that corresponds to each respective column of the first table; reconstructing an encrypted value with respect to the most significant bit; and determining the pivot column based on a result of the reconstruction of the encrypted value.

When executed by the processor, the executable code may further cause the processor to determine the pivot row by: retrieving elements of the pivot column; constructing a vector of tuples based on the elements of the pivot column; applying a predetermined positive minimum function to the vector of tuples; and determining the pivot row based on a result of the applying of the predetermined positive minimum function to the vector of tuples.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for using a privacy-preserving linear optimization technique to perform computations on encrypted data while ensuring that the original data remains confidential and secure from any unauthorized access based on secure multi-party computation.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
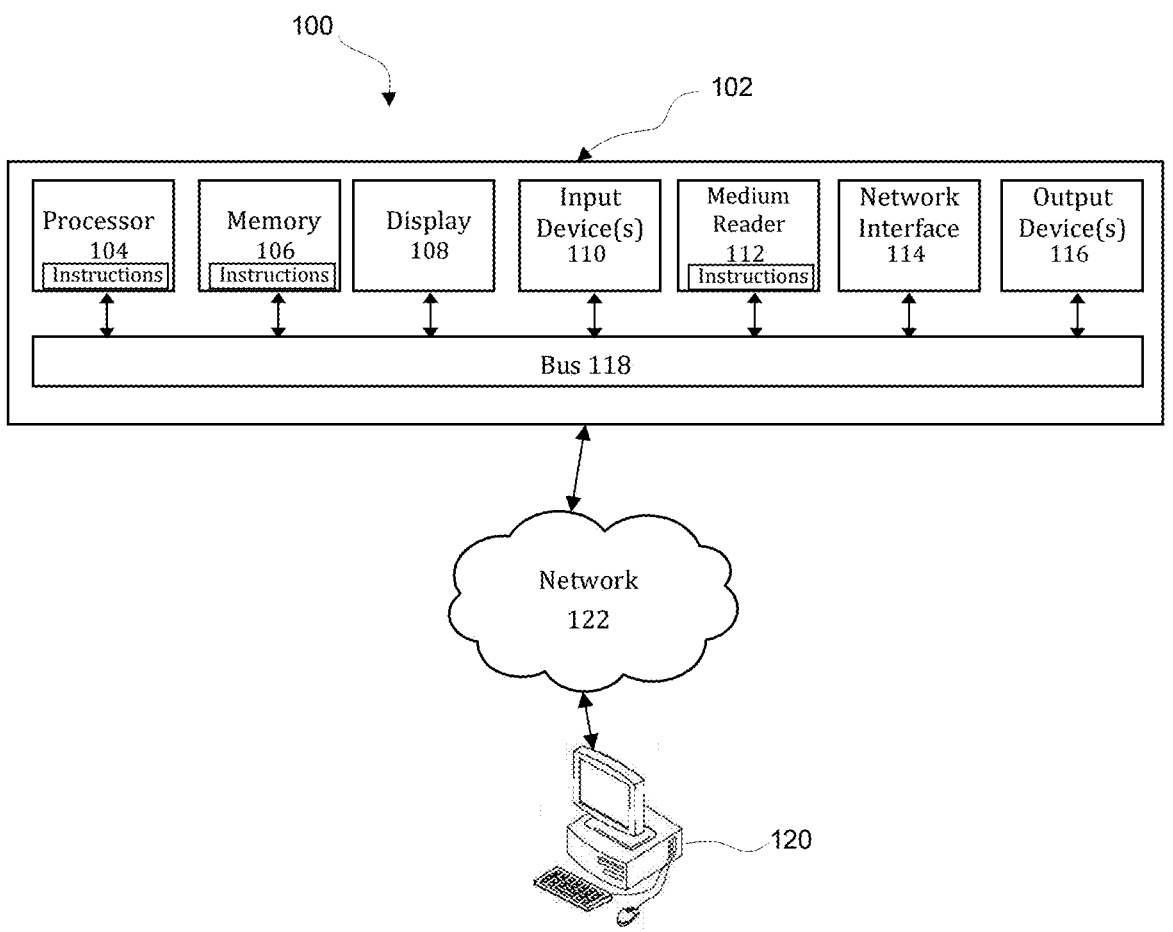
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using a privacy-preserving linear optimization technique to perform computations on encrypted data while ensuring that the original data remains confidential and secure from any unauthorized access based on secure multi-party computation.

Figure 2:
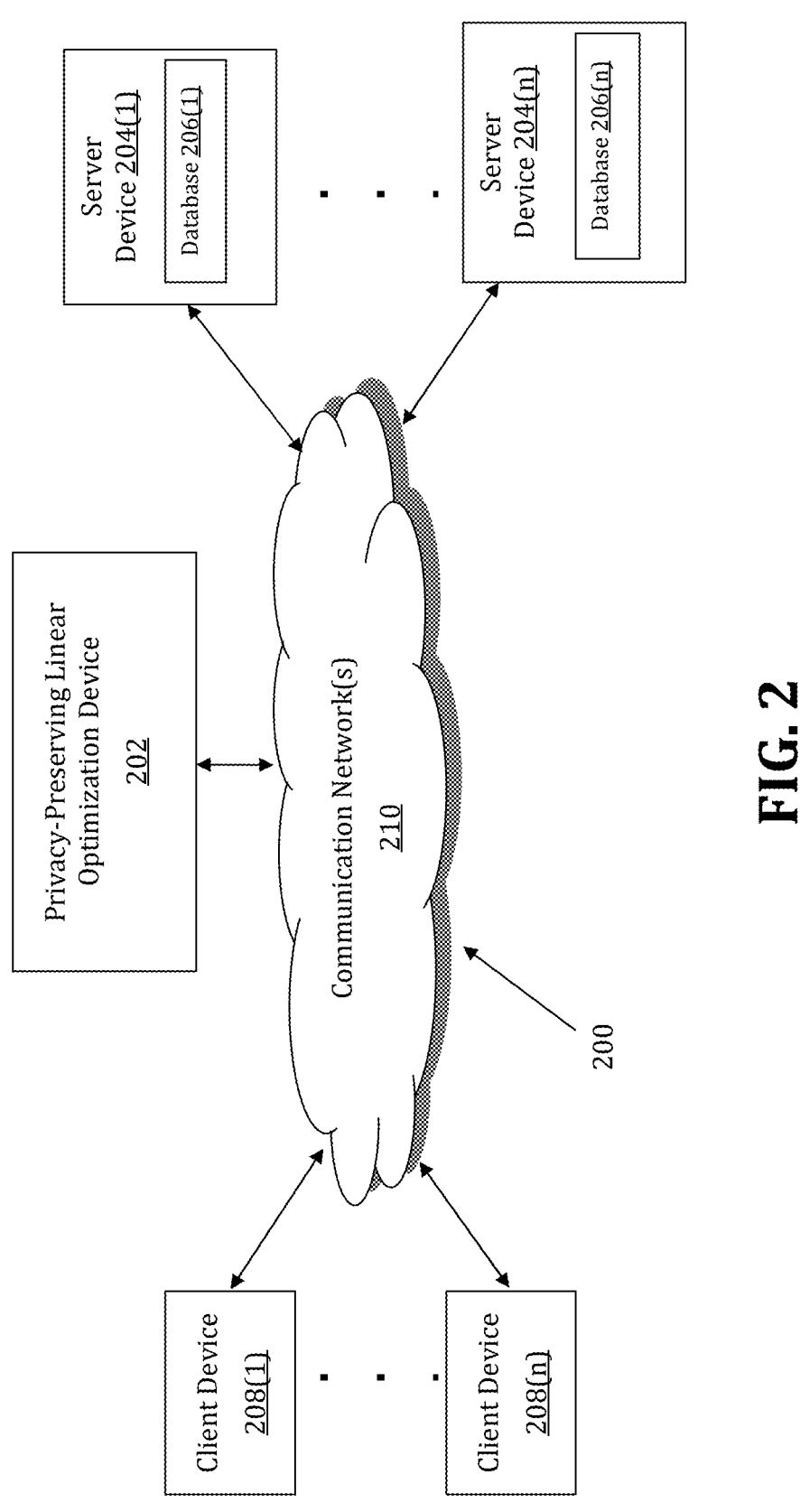
FIG. 2 illustrates an exemplary diagram of a network environment.

Referring to FIG. 2, a schematic of an exemplary network environment 200 for implementing a method for using a privacy-preserving linear optimization technique to perform computations on encrypted data while ensuring that the original data remains confidential and secure from any unauthorized access based on secure multi-party computation is illustrated. In an exemplary embodiment, the method is executable on any networked computer platform, such as, for example, a personal computer (PC).

The method for using a privacy-preserving linear optimization technique to perform computations on encrypted data while ensuring that the original data remains confidential and secure from any unauthorized access based on secure multi-party computation may be implemented by a Privacy-Preserving Linear Optimization (PPLO) device 202. The PPLO device 202 may be the same or similar to the computer system 102 as described with respect to FIG. 1. The PPLO device 202 may store one or more applications that can include executable instructions that, when executed by the PPLO device 202, cause the PPLO device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PPLO device 202 itself, may be located in virtual server(s) running in a cloud-based computing environment rather than being tied to one or more specific physical network computing devices. Also, the application(s) may be running in one or more virtual machines (VMs) executing on the PPLO device 202. Additionally, in one or more embodiments of this technology, virtual machine(s) running on the PPLO device 202 may be managed or supervised by a hypervisor.

In the network environment 200 of FIG. 2, the PPLO device 202 is coupled to a plurality of server devices 204(1)-204(n) that hosts a plurality of databases 206(1)-206(n), and also to a plurality of client devices 208(1)-208(n) via communication network(s) 210. A communication interface of the PPLO device 202, such as the network interface 114 of the computer system 102 of FIG. 1, operatively couples and communicates between the PPLO device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PPLO device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and PPLO devices that efficiently implement a method for using a privacy-preserving linear optimization technique to perform computations on encrypted data while ensuring that the original data remains confidential and secure from any unauthorized access based on secure multi-party computation.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PPLO device 202 may be a standalone device or integrated with one or more other devices or apparatuses, such as one or more of the server devices 204(1)-204(n), for example. In one particular example, the PPLO device 202 may include or be hosted by one of the server devices 204(1)-204(n), and other arrangements are also possible. Moreover, one or more of the devices of the PPLO device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PPLO device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store public exchange data and privacy-preserving linear optimization parameters.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the PPLO device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the PPLO device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the PPLO device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PPLO device 202, the server devices 204(1)-204(n), or the client devices 208(1)-208(n), for example, may be configured to operate as virtual instances on the same physical machine. In other words, one or more of the PPLO device 202, the server devices 204(1)-204(n), or the client devices 208(1)-208(n) may operate on the same physical device rather than as separate devices communicating through communication network(s) 210. Additionally, there may be more or fewer PPLO devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
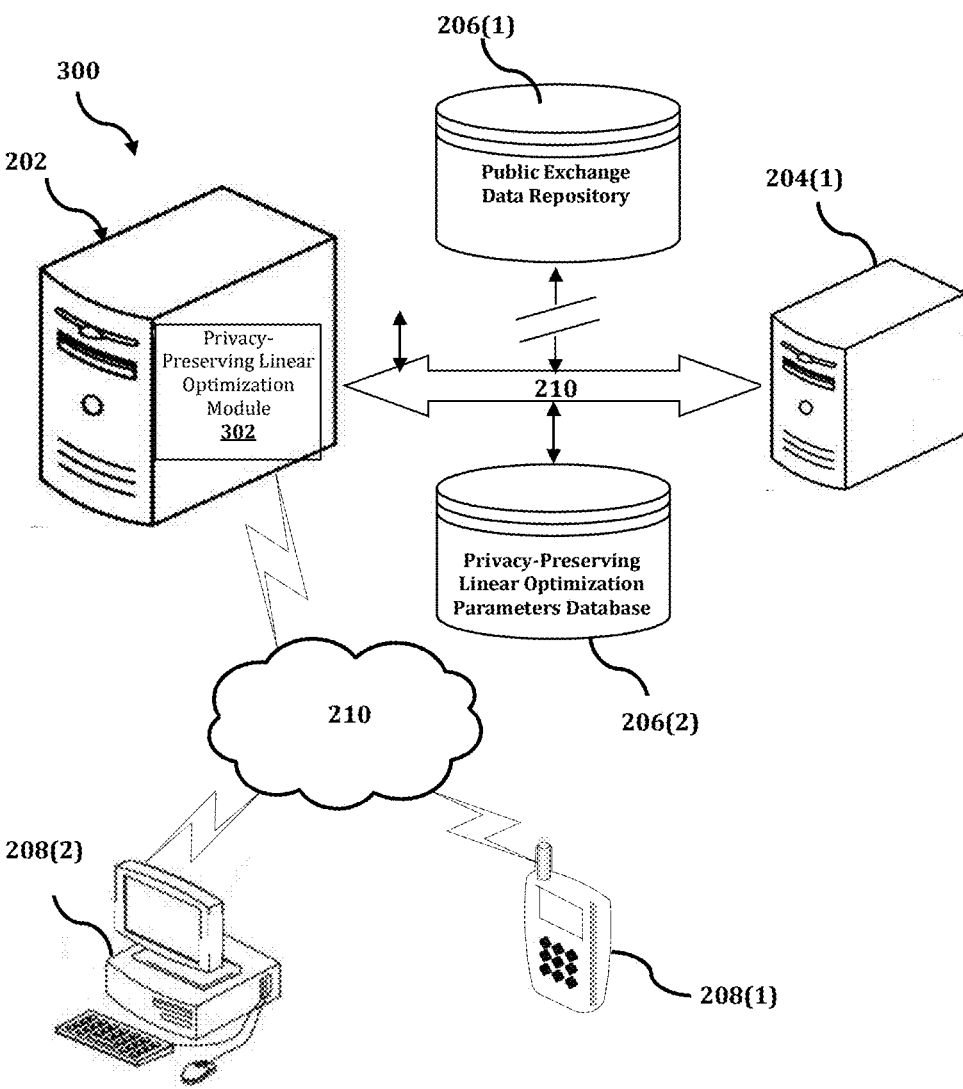
FIG. 3 shows an exemplary system for implementing a method for using a privacy-preserving linear optimization technique to perform computations on encrypted data while ensuring that the original data remains confidential and secure from any unauthorized access based on secure multi-party computation.

The PPLO device 202 is described and illustrated in FIG. 3 as including a privacy-preserving linear optimization module 302, although it may include other rules, policies, modules, databases, or applications, for example. As will be described below, the privacy-preserving linear optimization module 302 is configured to implement a method for using a privacy-preserving linear optimization technique to perform computations on encrypted data while ensuring that the original data remains confidential and secure from any unauthorized access based on secure multi-party computation.

An exemplary process 300 for implementing a system for using a privacy-preserving linear optimization technique to perform computations on encrypted data while ensuring that the original data remains confidential and secure from any unauthorized access based on secure multi-party computation by utilizing the network environment of FIG. 2 is illustrated as being executed in FIG. 3. Specifically, a first client device 208(1) and a second client device 208(2) are illustrated as being in communication with PPLO device 202. In this regard, the first client device 208(1) and the second client device 208(2) may be "clients" of the PPLO device 202 and are described herein as such. Nevertheless, it is to be known and understood that the first client device 208(1) and/or the second client device 208(2) need not necessarily be "clients" of the PPLO device 202, or any entity described in association therewith herein. Any additional or alternative relationship may exist between either or both of the first client device 208(1) and the second client device 208(2) and the PPLO device 202, or no relationship may exist.

Further, PPLO device 202 is illustrated as being able to access a public exchange data repository 206(1) and a privacy-preserving linear optimization parameters database 206(2). The privacy-preserving linear optimization module 302 may be configured to access these databases for implementing a method for using a privacy-preserving linear optimization technique to perform computations on encrypted data while ensuring that the original data remains confidential and secure from any unauthorized access based on secure multi-party computation.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the PPLO device 202 via broadband or cellular communication. Of course, these embodiments are merely exemplary and are not limiting or exhaustive.

Upon being started, the privacy-preserving linear optimization module 302 executes a process for using a privacy-preserving linear optimization technique to perform computations on encrypted data while ensuring that the original data remains confidential and secure from any unauthorized access based on secure multi-party computation. An exemplary process for using a privacy-preserving linear optimization technique to perform computations on encrypted data while ensuring that the original data remains confidential and secure from any unauthorized access based on secure multi-party computation is generally indicated at flowchart 400 in FIG. 4.

In process 400 of FIG. 4, at step S402, the privacy-preserving linear optimization module 302 receives, from each of several entities, a respective input that includes encrypted data. In an exemplary embodiment, each entity corresponds to a financial portfolio that is associated with a respective client that may be interested in participating in a collaborative endeavor to maximize returns on investment while ensuring privacy with respect to sensitive information.

At step S404, the privacy-preserving linear optimization module 302 constructs a table that includes first information that relates to a predetermined objective function, second information that relates to a predetermined boundary value, and third information that relates to a predetermined polynomial function that is applicable to the encrypted data received in step S402.

At step S406, the privacy-preserving linear optimization module 302 determines a pivot column and a pivot row of the table constructed in step S404. In an exemplary embodiment, the determination of the pivot column is achievable by performing the steps of: 1) applying a predetermined minimum element function to each respective column of the table; 2) computing a most significant bit of a respective vector that corresponds to each respective column; 3) executing a reconstruction of a corresponding encrypted value with respect to each most significant bit; and 4) determining the pivot column based on a result of the reconstruction of the encrypted value. In this context, each encrypted value may be understood as being a secret-shared value with respect to each most significant bit, because these values are hidden, i.e., "encrypted," and after executing the reconstruction, the values become public, i.e., unencrypted.

In an exemplary embodiment, the determination of the pivot row is achievable by performing the steps of: 1) retrieving elements of the pivot column; 2) constructing a vector of tuples based on the elements of the pivot column; 3) applying a predetermined positive minimum element function to the vector of tuples; and 4) determining the pivot row based on a result of the application of the positive minimum function to the vector of tuples.

At step S408, the privacy-preserving linear optimization module 302 updates the pivot row by performing a predetermined first operation that is based on the polynomial function and the boundary value. Then, at step S410, the privacy-preserving linear optimization module 302 updates the pivot column by performing a predetermined second operation that is based on the polynomial function, the boundary value, and the updated pivot row.

At step S412, the privacy-preserving linear optimization module 302 uses the updated pivot row and the updated pivot column to determine an optimum value that maximizes the polynomial function, subject to a constraint that a result of applying the polynomial function to the optimum value is less than or equal to the boundary value. In an exemplary embodiment, the determination of this optimum value has the effect of facilitating computations on the encrypted data while ensuring that the underlying original data remains confidential and secure from unauthorized access, thereby preserving privacy for all participating clients.

At step S414, the privacy-preserving linear optimization module 302 calculates a market netting metric that relates to a respective degree of risk to the privacy associated with each respective financial portfolio. In an exemplary embodiment, the market netting metric may include any one or more of a first metric that relates to an allocation of exposure of each participant in the collaborative endeavor, a second metric that relates to an amount of funds that are required with respect to a participant in the collaborative endeavor, and/or a third metric that relates to a number of shares associated with a participant in the collaborative endeavor.

In an exemplary embodiment, the present disclosure describes novel techniques of multi-part computation (MPC) and its application to Privacy Preserving Portfolio Optimization (PPPO) and netting, especially in an over-the-counter (OTC) market. Portfolio optimization is a critical financial problem, involving the allocation of assets to achieve an optimal balance of risk and return. However, traditional portfolio optimization techniques often require access to sensitive financial data, thereby raising privacy concerns. Through privacy-preserving techniques, investors can collaborate and optimize their portfolios without sharing raw financial data. In an exemplary embodiment, an objective is to facilitate secure collaboration among multiple parties, usually three or more, to jointly optimize their portfolios while ensuring data confidentiality. The use of MPC allows portfolio managers to compute the necessary financial metrics while keeping the underlying data encrypted.

Figure 5A:
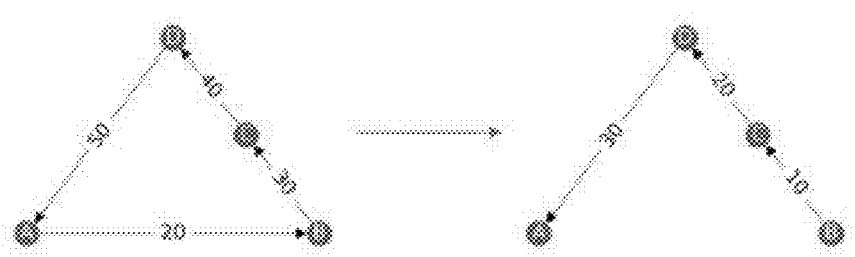
FIG. 5A and FIG. 5B are diagrams that illustrate an example of optimization of exposure among multiple parties with respect to using a privacy-preserving linear optimization technique to perform computations on encrypted data while ensuring that the original data remains confidential and secure from any unauthorized access based on secure multi-party computation, according to an exemplary embodiment.
Figure 5B:
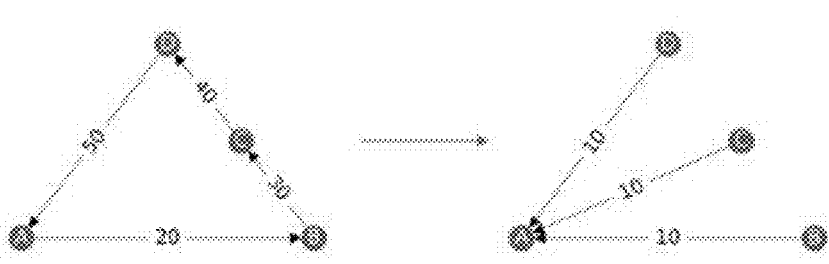

Regarding the OTC netting, the problem statement involves a set of counter parties and their exposures in an OTC market. In an exemplary embodiment, an optimizer minimizes the gross exposure for all parties while ensuring the following: 1) the net exposure for each party remains unchanged; and 2) there is no new exposure created between any two parties. Referring to FIG. 5A and FIG. 5B, examples of this notion are illustrated.

FIG. 5A and FIG. 5B are diagrams 500 and 520 that illustrate an example of optimization of exposure among multiple parties with respect to using a privacy-preserving linear optimization technique to perform computations on encrypted data while ensuring that the original data remains confidential and secure from any unauthorized access based on secure multi-party computation, according to an exemplary embodiment.

Referring to FIG. 5A, in the graph on the left side of diagram 500, the gross exposure for all parties before optimization is 20+30+40+50=140. In the graph on the right side of diagram 500, after optimization, the gross exposure decreases to 10+20+30=60. The net exposure remains unchanged and no new exposure is created between any two parties.

Referring to FIG. 5B, diagram 520 illustrates an example of optimization output if one constraint is relaxed. In this case, the gross exposure decreases from 140 to 30, but a new exposure is created between party A and party C that did not exist previously. In an exemplary embodiment, it is preferred that this constraint be imposed in order to avoid situations where two parties must enter trade agreements solely for optimization, such as, for example, a collateral exchange or a commission sharing agreement (CSA).

In an exemplary embodiment, definitions are provided for a computational security parameter $\kappa$, a statistical security parameter $\lambda$, a finite field $\mathbb{F}$, and parameters $p=|\mathbb{F}|$ and $n=\lceil \log_2 p \rceil$. It is assumed that $\mathbb{F}$ is a large field such that $p \geq 2^{\lambda}$. For a field element $x \in \mathbb{F}$, $[\![x]\!]$ is denoted as an additive authenticated secret sharing of x. For the binary case when $x \in \mathbb{F}_2$, the secret sharing is denoted as $\mathbb{F}_2 x [\![_2$.

Extended daBits and A2B: Functionality $1 - \mathcal{F}_{edaBit}$. edaBit: On input (edabit, $\ell$), from all parties, in which $\ell \leq n$, uniformly sample $(r_0, \ldots, r_{\ell-1}) \in \{0,1\}^{\ell}$ and define $$r = \sum_{j=0}^{\ell-1} 2^j \cdot r_j.$$

Distribute $$\left( [\![r]\!], \{[\![r_j]\!]_2\}_{j=0}^{\ell-1} \right)$$

to parties.

Protocol $1 - \Pi_{A2B}$: Input: Authenticated secret share $[\![x]\!]$ Define the function y=AddMod(x, p) to be y=(x>p)?x−p:x. A2B: 1) Parties send (edabit, n) to $\mathcal{F}_{edaBit}$, which returns $$\left( [\![r]\!], \{[\![r_j]\!]_2\}_{j=0}^{n-1} \right)$$

to parties. 2) Execute y=Open($[\![x]\!]-[\![r]\!]$) and bit-decomposite y as $(y_0, \ldots, y_{n-1})$. 3) Compute and output $$\{[\![x_j]\!]_2\}_{j=0}^{n-1} = \text{AddMod}(\{y_j\}_{j=0}^{n-1}, \{[\![r_j]\!]_2\}_{j=0}^{n-1}, p).$$

The most-significant bit (MSB) function MSB( ) that takes input and outputs its most significant bit $[\![x_{n-1}]\!]_2$ is done by invoking $\Pi_{A2B}$.

Secure Comparison—Procedure $1-\pi_{ComparisonInitial}$: Input: For $i \in \{0,1\}$, $P_0$ and $P_1$ hold authenticated additive secret shares $([\![v_{i,0}]\!], \ldots, [\![v_{i,n-1}]\!])$ in which $v_{i,j} \in \{0, 1\}$ for $j|[0, n)$. They also know a shared seed $s \in \{0, 1\}^{\kappa}$. Procedure: 1) From PRG(s), uniformly sample a bit $\beta \in \{0,1\}$. 2) Initialize $[\![w_{accum}]\!]=0$. 3) For $j \in (n \ldots, 1)$, set $$[\![u_j]\!] \leftarrow [\![v_{0,j-1}]\!] - [\![v_{1,j-1}]\!]$$

$$[\![w_j]\!] \leftarrow [\![u_j]\!] - 2\beta \cdot [\![u_j]\!]$$

$$[\![c_j]\!] \leftarrow -1 + [\![w_j]\!] + [\![w_{accum}]\!]$$

$$[\![w_{accum}]\!] \leftarrow [\![w_{accum}]\!] + [\![w_j]\!] \cdot 2^{2+j}.$$

4) Set $c_0 = w_{accum}$. 5) From PRG(s), uniformly sample a permutation $\pi$: $[0, n] \rightarrow [0, n]$ and $$\{s_j\}_{j=0}^{n}$$

from F\{0}. 6) For $j \in [0,n]$, set $[\![d_j]\!] \leftarrow s_j \cdot [\![c_{\pi(j)}]\!]$. 7) Output $\beta$ and $$\{[\![d_j]\!]\}_{j=0}^n.$$

Procedure 2—$\pi_{ComparisonFinal}$: Input: $P_0$ and $P_1$ hold $$\{[\![d_j]\!]\}_{j=0}^n$$

and P* holds the values of $$\{d_j\}_{j=0}^n.$$

Comparison: 1) P* sets b=0 if $\exists j \in [0, n]$ such that $d_j=0$; otherwise, it sets b=1. 2) P* acts as a client to securely input secrets b to $P_0$ and $P_1$. $P_0$ and $P_1$ outputs $[\![b]\!]$. Consistency check: 1) P*$_{computes}$ $$e = \prod_{j=0}^n d_j,$$

acts as a client to securely input e to $P_0$ and $P_1$, who obtain $[\![e]\!]$. 2) P* defines a value $h \in F$ such that h is uniformly sampled from $\mathbb{F}$ if b=0, and $h=e^{-1}$. Otherwise, P* acts as client to securely input h to $P_0$ and $P_1$, who obtain $[\![h]\!]$. 3) P*, $P_0$ and $P_1$ check the consistency by invoking CheckMult ($[\![e]\!]$; $[\![d_{i,0}]\!]$, . . . , $[\![d_{i,n}]\!]$), CheckMult($[\![b]\!]$; $[\![e]\!]$ $[\![h]\!]$), and CheckMult(0; 1−$[\![b]\!]$, $[\![e]\!]$).

Protocol 2—$\Pi_{CompBits}$: Input: $P_0$ and $P_1$ hold the authenticated additive secret shares $$\left( \{[\![v_{0,j}]\!]\}_{j=0}^{n-1}, \{[\![v_{1,j}]\!]\}_{j=0}^{n-1} \right).$$

They define two field elements $(v_0, v_1) \mathbb{F}^2$ such that $$v_i = \sum_{j=0}^{n-1} 2^j \cdot [\![v_{i,j}]\!].$$

P* has no input. Comparison: 1) $P_0$ and $P_1$ invoke the procedure $\pi_{Coin}$ to obtain a $\kappa$-bit shared seed $s\{0, 1\}^\kappa$. 2) $P_0$ and $P_1$ invoke the procedure $\pi_{Comparisoninitial}$ with inputs $$\left( \{[\![v_{0,j}]\!]\}_{j=0}^{n-1}, \{[\![v_{1,j}]\!]\}_{j=0}^{n-1}, s \right),$$

which outputs $\beta$ and $$\{[\![d_j]\!]\}_{j=0}^n.$$

3) $P_0$ and $P_1$ with inputs, reveal $$\{[\![d_j]\!]\}_{j=0}^n \text{ to } P^*.$$

4) P*. $P_0$ and $P_1$ invoke the procedure $\pi_{ComparisonFinal}$ with inputs either the authenticated secret shares or the true values of $$\{d_j\}_{j=0}^n,$$

which outputs $[\![b]\!]$ $P_0$ and $P_1$. 5) $P_0$ and $P_1$ output $[\![b]\!]+\beta-2\beta[\![b]\!]$.

Protocol 3—$\Pi_{MSB}$: Input: Authenticated secret share $[\![x]\!]$. MSB: 1) P* uniformly samples $a \in F$ and computes its bit decomposition $(a_0, . . . , a_{n-1})$ such that $$a = \sum_{j=0}^{n-1} a_i \cdot 2^i.$$

P* acts as a client to input these values to $P_0$ and $P_1$, who hold $([\![a]\!], [\![a_0]\!], . . . , [\![a_{n-1}]\!])$. 2) $P_0$ and $P_1$ executes $$\text{CheckZero}\left( [\![a]\!] - \sum_{i=0}^{n-1} 2^i \cdot [\![a_i]\!] \right).$$

3) $P_0$ and $P_1$ compute $[\![y]\!]=2[\![x]\!]$ and $[\![r]\!]=[\![y]\!]+[\![a]\!]$, and they execute r=Open($[\![r]\!]$). 4) Parties send $$\left( \{r_i\}_{i=0}^{n-1}, ([\![a_i]\!])_{i=0}^{n-1} \right)$$

to $\mathcal{F}_{CompBits}$, which returns $[\![\beta]\!]$ such that $[\![\beta]\!]=1(r \geq a)$. 5). Output $[\![c]\!]=r[0] \oplus [\![a[0]]\!] \oplus (1−[\![\beta]\!])$.

Protocol 4—$\Pi_{Comp}$: Input: $P_0$ and $P_1$ hold the authenticated additive secret shares $([\![v_0]\!], [\![v_1]\!])$ such that $(v_0, v_1) \in \mathbb{F}^2$. P* has no input. Comparison: Parties compute and output $1(v_0 \geq v_1) \in \text{MSB}([\![v_1]\!]−[\![v_0]\!])$.

Secure Truncation: Protocol 5—$\Pi_{Trunc}$: Input: Authenticated secret share $[\![x]\!]$. Define m to be the number of bits to truncate. Truncation: 1) Parties send (edabit, $n−m+\lambda$) to $\mathcal{F}_{edaBit}$, which returns $$\left( [\![r]\!], \{[\![r_j]\!]_2\}_{j=0}^{n-m+\lambda-1} \right)$$

to parties. 2) Parties send (edabit, m) to $\mathcal{F}_{edaBit}$, to, which returns $$\left( [\![r']\!], \{[\![r'_j]\!]_2\}_{j=0}^{m-1} \right)$$

to 2) Parties send (edabit, m) to $\mathcal{F}_{edaBit}$, to, which returns $([\![r']\!], \{[\![r'_j]\!]_2\}_{j=0}^{m-1})$ parties. 3) Parties send (edabit, 1) to $\mathcal{F}_{edaBit}$ to, which returns $([\![r'']\!], [\![r'']\!]_2)$ parties. 4) Compute $[\![y]\!]=2^{n-1}+[\![x]\!]$ and execute z=Open($[\![b]\!]+2^m \cdot [\![r]\!]+[\![r]\!]$). 5) Compute $$[\![v]\!]_2 = \text{LessThan}(\{z_j\}_{j=0}^{m-1}, \{[\![j'_i]\!]_2\}_{j=0}^{m-1}).$$

Use $([\![z'']\!], [\![r'']\!]_2)$ to convert it to $[\![v]\!]$. 6) Compute $[\![x \bmod 2^m]\!]=[\![z \bmod 2^m]\!]−[\![r']\!]+2^m \cdot [\![v]\!]$. 7) Output $(2^m)^{-1} \cdot ([\![x]\!]−[\![x \bmod 2^m]\!])$.

Secure Division: Proposed solutions based on long division require at least $\mathcal{O}(n^2)$ communication overhead. In an exemplary embodiment, the resulting amount of communication overhead is $\mathcal{O}(n)$. Procedure 3—$\pi_{zkMSB}$: Input: One-side authenticated secret share $[\![x]\!]^{\Delta}$. Assume that x is known by the prover $P_i$ and authenticated by the verifier $P_j$. $\Delta$ is the MAC key of $P_j$. Proof: 1) Send (edabit, n) to $\mathcal{F}_{ZKedaBit}$, which returns $$([\![r]\!]^{\Delta}, ([\![r_i]\!]_2^{\Delta})_{i=0}^{n-1})$$

such that $$r = \sum_{i=0}^{n-1} r_i \cdot 2^i.$$

2) Send (edabit, 1) to $\mathcal{F}_{ZKedaBit}$, which returns $$([\![s]\!]^{\Delta}, [\![s]\!]_2^{\Delta}).$$

3) Execute $d=\text{Open}([\![x]\!]^{\Delta}-[\![r]\!]^{\Delta})$. Denote $$(d_i)_{i=0}^{n-1}$$

as the bit-decomposition of d. 4) Compute $$([\![x_i]\!]_2^{\Delta})_{i=0}^{n-1} = \text{AddMod}((d_i)_{i=0}^{n-1}, ([\![r_i]\!]_2^{\Delta})_{i=0}^{n-1}, p).$$

5) Execute $$c = \text{Open}([\![x_{n-1}]\!]_2^{\Delta} \oplus [\![s]\!]_2^{\Delta}).$$

Compute and output $\text{MSB}(x)=c\cdot(1-2\ [\![s]\!]^{\Delta})+[\![s]\!]^{\Delta}$.

Protocol 6—$\Pi_{DivConst}$: Input: Authenticated secret shares $[\![a]\!]$ and a public divisor d. Parameters: Define $0\leq n^0 <d$ and $n^1$ such that $n=n^1\cdot d+n^0$. Define $n'=\lfloor n/2\rfloor$. For $i\in\{0, 1\}$, $P_i$ holds the share $a_i$, $$0 \leq a_i^0 < d \text{ and } a_i^1$$

such that $$a_i = a_i^1 \cdot d + a_i^0.$$

Denote $\bar{i}$ as $1-i$ and $[\![x_i]\!]^{\Delta_{\bar{i}}}$ as a secret value $x_i$ known by $P_i$ and authenticated by $P_{\bar{i}}$. Division: For $i\in\{0, 1\}$, parties construct $$([\![a_i^0]\!]^{\Delta_{\bar{i}}}, [\![a_i^1]\!]^{\Delta_{\bar{i}}})$$

and check consistency by $$\text{CheckZero}([\![a_i]\!]^{\Delta_{\bar{i}}} - [\![a_i^1]\!]^{\Delta_{\bar{i}}} \cdot d - [\![a_i^0]\!]^{\Delta_{\bar{i}}}).$$

$P_i$ proves that $$MSB(a_i^0) = 0 \wedge MSB(a_i^0 - d) = 1.$$

2) Compute $[\![m]\!]=\text{MSB}([\![a]\!])$. 3) For $i\in\{0, 1\}$, $P_i$ locally computes $x_i=\text{MSB}(a_i)$. Parties construct Invoke $\mathcal{F}_{QS}$, to prove that $[\![x_i]\!]^{\Delta_{\bar{i}}}=\text{MSB}([\![a_i]\!]^{\Delta_{\bar{i}}})$ and $[\![x_i]\!]^{\Delta_{\bar{i}}}\cdot(1-[\![x_i]\!])=0$. 4) Define $[\![x]\!]=[\![x_1]\!]^{\Delta_0}+[\![x_0]\!]^{\Delta_1}$. 5) Compute $[\![corr]\!]=(1-[\![m]\!])[\![x_0]\!]^{\Delta_1}[\![x_1]\!]^{\Delta_0}-[\![m]\!](1-[\![x_0]\!]^{\Delta_1})$ $(1-[\![x_1]\!]^{\Delta_0})$. 6) For $i\in\{0, 1\}$, $P_i$ computes $$y_i = idiv(a_i^0 - x_i \cdot n^0, d).$$

Parties construct $[\![y_i]\!]^{\Delta_{\bar{i}}}$. Invoke $\mathcal{F}_{QS}$ to prove the consistency of $$([\![y_i]\!]^{\Delta_{\bar{i}}}, [\![x_i]\!]^{\Delta_{\bar{i}}}, [\![a_i^0]\!]^{\Delta_{\bar{i}}}, n^0, d).$$

This is done by proving $$[\![y_i]\!]^{\Delta_{\bar{i}}} = -MSB([\![a_i^0]\!]^{\Delta_{\bar{i}}} - [\![x_i]\!]^{\Delta_{\bar{i}}} \cdot n^0).$$

7) Define $[\![B]\!]=[\![y_0]\!]^{\Delta_1}+[\![y_1]\!]^{\Delta_0}$. 8) Compute $$[\![A]\!] = [\![a_0^0]\!]^{\Delta_1} + [\![a_1^0]\!]^{\Delta_0} - ([\![x]\!] - [\![corr]\!]) \cdot n^0.$$

Compute $[\![C_1]\!]=\text{MSB}([\![A]\!]-d)$, $[\![C_2]\!]=\text{MSB}([\![A]\!])$, $[\![C_3]\!]=\text{MSB}([\![A+d]\!])$, and $[\![C]\!]=[\![C_1]\!]+[\![C_2]\!]+[\![C_3]\!]$. 9) Output $[\![z]\!]=[\![x]\!]+[\![corr]\!]\cdot n^1+(1-[\![C]\!])-[\![B]\!]$.

At step 6 of Protocol 6, the party $P_i$ proves that it correctly computes $$y_i = idiv(a_i^0 - x_i \cdot n^0, d).$$

Define $$w_i = a_i^0 - x_i \cdot n^0.$$

Observe that $$0 \leq a_i^0,$$

$n^0<d$ and $x_i\in\{0, 1\}$, thus $-d<w_i<d$. This yields $y_i=0$ if $0\leq w_i<d$ and $y_i=-1$ if $-d<w_i<0$ Hence, the proof can be reduced to check whether $y_i=-\text{MSB}(w_i)$.

All of the proof of correct local computation can be reduced to proof of correct MSB computation on field elements. The zero-knowledge proof of MSB can be done by Vector-Oblivious Linear Evaluation-Zero Knowledge (VOLE-ZK) with zk-edaBit, which directly operates on the secret values that are generated as a result of authentication in the two-phase commit (2PC) protocol. The amortized cost for the proof of a correct MSB computation is $\mathcal{O}(\log_2 p)$.

Protocol 7—$\Pi_{Div}$: Input: Authenticated secret shares $[\![x]\!]$, $[\![y]\!]$. Division: 1) Invoke $\mathcal{F}_{Coin}$ to sample a uniform authenticated secret share $[\![r]\!]$. 2) Execute d=Open($[\![r]\!]\cdot[\![v]\!]$) and locally compute Trunc (d, m). 3) Invoke $\mathcal{F}$ Div-Const to compute $[\![z]\!]=\lfloor[\![x]\!]/d\rfloor$. 4) Compute $[\![a]\!]=[\![z]\!]\cdot[\![r]\!]$ and execute Trunc ($[\![a]\!]$, m), which returns $[\![b]\!]$. Parties output $[\![b]\!]$.

Online Phase: Procedure 4—$\pi_{Min}$: Input: A vector of authenticated shares $[\![x]\!]$, in which $x\in\mathbb{F}^n$. Define $h=\lceil\log_2 n\rceil$. Procedure: 1) Initialize a depth-h binary tree and place the tuple (j, $[\![x_j]\!]$) on leaves for $j\in[\![0, n-1]\!]$. Denote the j-th node at the level-i as $$([\![b_i^j]\!], [\![g_i^j]\!]).$$

2) For i=h, h−1, . . . , 1 and j=[0, $2^{i-1}$], parties do: 2a) Send $$(comp, [\![g_i^{2j}]\!], [\![[g_i^{2j+1}]\!]])$$

to $\mathcal{F}_{Comp}$, which outputs a binary result $[\![c_j]\!]$ such that $c_j\in\{0, 1\}$. 2b) Compute $$[\![b_{i-1}^j]\!] = (1-[\![c_j]\!])\cdot([\![b_i^{2j}]\!]-[\![b_i^{2j+1}]\!]) + [\![b_i^{2j+1}]\!] \text{ and } [\![g_{i-1}^j]\!] =$$

$$(1-[\![c_j]\!])\cdot([\![g_i^{2j}]\!]-[\![g_i^{2j+1}]\!]) + [\![g_i^{2j+1}]\!].$$

2c) Set the j-th node at the level—(i−1) as $$([\![b_{i-1}^j]\!], [\![g_{i-1}^j]\!]).$$

3) Output $$([\![b_0^0]\!], [\![g_0^0]\!]).$$

Procedure 5—$\pi_{PositiveMin}$: Input: A vector of tuples $(([\![n_0]\!], [\![d_0]\!]) . . . , ([\![n_{m-1}]\!], [\![d_{m-1}]\!]))$. For $i\in[\![0,m-1]\!]$, the i-th tuple determines a value $[\![n_i/d_i]\!]$, in which $n_i$ is the numerator and $d_i$ is the denominator. Define $h=\lceil\log_2 m\rceil$. Procedure: 1) Initialize a depth-h binary tree and place the tuple (j, $[\![n_j]\!]$, $[\![d_j]\!]$) on leaves for $j\in[\![0, n-1]\!]$. Denote the j-th node at the level-i as $$([\![b_i^j]\!], [\![n_i^j]\!], [\![d_i^j]\!]).$$

2) For i=h, h−1, . . . , 1 and j=$[\![0, 2^{i-1}]\!]$, parties do: 2a) Compute $$[\![s_{00}]\!] = MSB([\![n_i^{2j}]\!]), [\![s_{01}]\!] = MSB([\![d_i^{2j}]\!]), [\![s_{10}]\!] = MSB([\![n_i^{2j+1}]\!]),$$

$$\text{and } [\![s_{11}]\!] = MSB([\![d_i^{2j+1}]\!]).$$

2b) Compute $[\![e_0]\!]=[\![s_{00}]\!]\oplus[\![s_{01}]\!]$ and $[\![e_1]\!]=[\![s_{10}]\!]\oplus[\![s_{11}]\!]$. 2c) Send $$(comp, [\![n_i^{2j}]\!]\cdot[\![d_i^{2j+1}]\!], [\![n_i^{2j+1}]\!]\cdot[\![d_i^{2j}]\!])$$

to $\mathcal{F}_{Comp}$, which returns $$[\![f]\!] = 1(n_i^{2j}d_i^{2j+1} \geq n_i^{2j+1}d_i^{2j}).$$

2d) For $$(\text{left, right}) \in \{([\![b_i^{2j}]\!], [\![b_i^{2j+1}]\!]), ([\![n_i^{2j}]\!], [\![n_i^{2j+1}]\!]), ([\![n_i^{2j}]\!], [\![n_i^{2j+1}]\!])\}$$

and the counter $\ell\in\{0,1,2\}$, compute $[\![q\ell]\!]=([\![e_0]\!]\oplus[\![e_1]\!])\cdot((1-[\![e_0]\!])\cdot(\text{left}-\text{right})+\text{right})+(1-[\![e_0]\!])\cdot(1-[\![e_1]\!])\cdot((1-[\![f]\!])\cdot(\text{left}-\text{right})+\text{right})$. Compute $[\![q_1]\!]=[\![q_1]\!]+[\![e_0]\!]\cdot[\![e_1]\!]$ and $[\![q_2]\!]=[\![q_2]\!]-[\![e_0]\!]\cdot[\![e_1]\!]$. Set $$([\![b_{i-1}^j]\!], [\![n_{i-1}^j]\!], [\![d_{i-1}^j]\!]) = ([\![q_0]\!], [\![q_1]\!]^-, [\![q_2]\!]).$$

3) Output $$([\![b_0^0]\!], [\![n_0^0]\!], [\![d_0^0]\!]).$$

Procedure 6—$\pi_{SelectVec}$: Input: An authenticated share such that $x\in[0, m)$. Index to selection vector: 1) $P_0$ and $P_1$ invoke $\mathcal{F}_{Coin}$ to sample a uniform authenticated secret share $[\![r]\!]$. Reveal r to P*. 2) P* computes $(k_0, k_1)$=DPF.Gen (r, m). It sends $k_0$ to $P_0$ and $k_1$ to $P_1$. 3) For $i\in\{0, 1\}$, $P_i$ computes $v_i$=DPF.Eval($k_i$). Define $[\![v]\!]$ such that $v\in\mathbb{F}^m$ and $v=v_0+v_1$. 4) $P_0$ and $P_1$ execute o=Open(($[\![x]\!]-[\![r]\!]$) mod m). Output $[\![v]\!]$=RightRotate($[\![v]\!]$, o).

Procedure 7—$\pi_{MemoryAccess}$: Input: A vector of authenticated shares $[\![x]\!]$ such that $x\in\mathbb{F}^m$. An authenticated share of index $[\![a]\!]$ for $a\in[\![0, m-1]\!]$. For write access, additionally input $[\![z]\!]$. Memory access: 1) Invoke the Procedure $\pi_{SelectVec}$ with input $[\![a]\!]$, which outputs a selection vector $[\![v]\!]$ such that $v_a$=1 and $v_i$=0 for $i\in[0, m-1]\backslash\{a\}$ 2) If Read, compute and output $$[\![y]\!] = \sum_{i=1}^{m-1}[\![v_i]\!]\cdot[\![x_i]\!].$$

3) If Write, compute and output $[\![y]\!]$ in which $[\![y_i]\!]=[\![v_i]\!]\cdot([\![z]\!]-[\![x_i]\!])+[\![x_i]\!]$ for $i\in[0, m-1]$.

Protocol 8—$\Pi_{LP}$: Input: Define $C\in\mathbb{F}^{m\times n}$, $b\in\mathbb{F}^m$ and $f\in\mathbb{F}^n$. Define a polynomial $f(X_0 . . . , X_{n-1})=f_0\cdot X_0+ . . . +f_{n-1}\cdot X_{n-1}$. The goal is to derive a value of $x \in \mathbb{F}^n$ which maximizes $f(x)$ with subject to $Cx < b$. Define the following functions: 1) $MSB(\llbracket x \rrbracket)$: return the most significant bit of x. 2) $Min(\llbracket x \rrbracket)$: return the index and value of the minimum element from a vector of real integers encoded in $\mathbb{F}$. 3) $PositiveMin(\llbracket x \rrbracket)$: return the index and value of the minimum positive element from a vector or real integers encoded in $\mathbb{F}$. 4) $Get(\llbracket T \rrbracket, i, j) \rightarrow \mathbb{F}$: return an element from a table by its row and column index (i, j). If the index is replaced by $\cdot$, return the whole row or column. 5) $Set(\llbracket T \rrbracket, i, j, \llbracket x \rrbracket)$: update the entry indexed by (i, j) and return the updated table. If the index is replaced by $\cdot$, input an vector and $\llbracket x \rrbracket$ update the whole row or column. 6) $Trunc(\llbracket x \rrbracket, d)$: truncate the authenticated sharing of x by d bits.

Simplex: Define a table $$T = \begin{pmatrix} C & b \\ f^T & y \end{pmatrix} \in \mathbb{F}^{(m+1) \times (n+1)},$$

in which $y = f(x)$ For $i \in [0, m]$, $j \in [0, n]$ denote the i-th rows as $t_i$, the j-th column as $t^j$ and the j-th item at the i-th row as $$t_i^j.$$

Parties construct authenticated table $\llbracket T \rrbracket$. 2) Find the pivot column: 2a) Compute $$(\llbracket c \rrbracket, \llbracket t_m^c \rrbracket) = Min(\llbracket t_m[:n-1] \rrbracket).$$

2b) Compute $\llbracket s \rrbracket = MSB(\llbracket c \rrbracket)$ and execute $s = Open(\llbracket s \rrbracket)$. If $s = 0$, output $$\llbracket t_m^n \rrbracket.$$

3) Find the pivot row: 3a) Fetch the c-th column by $\llbracket t^c \rrbracket = Get(\llbracket T \rrbracket, \cdot, \llbracket c \rrbracket)$. 3b) Construct a vector of tuples $$\llbracket H \rrbracket = \{(\llbracket t_i^n \rrbracket, \llbracket t_i^c \rrbracket)\}_{i=0}^{m-1}.$$

3c) Compute $$(\llbracket d \rrbracket, \llbracket tn_d^c \rrbracket, \llbracket td_d^c \rrbracket) = PositiveMin(\llbracket H \rrbracket)$$

and followed by $$\llbracket t_d^c \rrbracket = \llbracket tn_d^c \rrbracket / \llbracket td_d^c \rrbracket.$$

4) Fetch the d-th row by $\llbracket t_d \rrbracket = Get(\llbracket T \rrbracket, \llbracket d \rrbracket, \cdot, \llbracket t_d \rrbracket)$. Update the d-th row by computing $$\llbracket t_d \rrbracket = \llbracket t_d \rrbracket / \llbracket t_d^c \rrbracket$$

and executing $Set(\llbracket T \rrbracket, \llbracket d \rrbracket, \cdot, \llbracket t_d \rrbracket)$. 5) For $i \in [0, m] \setminus \{d\}$, fetch the c-th item by $$t_i^c = Get(\llbracket T \rrbracket, i, c)$$

and update the i-th row by computing $$\llbracket t_i \rrbracket = \llbracket t_i \rrbracket - Trunc(\llbracket t_d \rrbracket \cdot \llbracket t_i^c \rrbracket,$$

PRECISION) and executing $Set(\llbracket T \rrbracket, \llbracket i \rrbracket, \cdot, \llbracket t_i \rrbracket)$. 6) Return to step 2.

In an exemplary embodiment, the Simplex algorithm is a method for solving linear programming problems. Its goal is to find values for the decision variables $x_0, x_1, \ldots, x_n$ that maximize (or minimize) the objective function $f(x)$ while satisfying all of the constraints. This algorithm proceeds through iterations, as follows: 1) Start with an initial feasible solution, often referred to as the "basic feasible solution". 2) At each iteration, select a pivot element that determines the entering variable and the leaving variable. 3) Update the values of the decision variables to move toward an improved solution that either increase the objective function value (for maximization problems) or decreases the objective function value (for minimization problems). 4) Repeat the iterations until no further improvement can be made, at which point an optimal solution is found.

The algorithm operates on a tableau, which is a tabular representation of the linear programming problem. It iteratively pivots and updates entries in the tableau to move toward the optimal solution.

Two-Phase Simplex: The Two-Phase Simplex method is an extension of the Simplex method. In general, the Two-Phase Simplex method is employed when finding an initial basic feasible solution is challenging or when it is unclear whether a feasible solution exists. It serves to convert an infeasible problem into a feasible problem while preserving the linear programming structure. More specifically, it is designed to handle linear programming problems that involve inequalities with equality constraints and is particularly useful when the initial basic feasible solution is not readily available.

Phase I—Artificial Variable Phase: 1) Introduce artificial variables, also referred to herein as "dummy" variables or "slack" variables, to convert inequality constraints with equality constraints. 2) Formulate an auxiliary linear programming problem with the objective of minimizing the sum of these artificial variables while still satisfying the original constraints. 3) Apply the standard Simplex method to solve this auxiliary problem in order to find an initial basic feasible solution. 4) If the optimal solution of the auxiliary problem has a non-zero objective value, this indicates that the original linear programming problem is infeasible, i.e., it has no feasible solution. In this case, the algorithm terminates.

Phase II—Standard Simplex Phase: 1) Remove the artificial variables from the problem, as they were introduced only for Phase I. 2) Use the initial basic feasible solution obtained in Phase I as a starting point. 3) Apply the standard Simplex method to the modified linear programming problem with the original objective function. 4) Iterate through the Simplex tableau to improve the solution until an optimal solution is reached or it is determined that no feasible solution exists.

Tableau Simplex: The algorithm operates on a tableau, which is a tabular representation of the linear programming problem. It iteratively pivots and updates entries in the tableau in order to move toward the optimal solution. It consists of the following components: 1) Tableau Rows: Each row in the tableau corresponds to one of the constraints, and there is an additional row for the objective function. 2) Tableau Columns: Each column in the tableau corresponds to a decision variable, including any additional columns for slack or surplus variables introduced to convert inequalities into equalities. 3) Tableau Entries: The entries in the tableau are coefficients that represent the linear relationships between decision variables and constraints. These coefficients are derived from the objective function and the constraints. 4) Tableau Objective Row: The bottom row of the tableau represents the coefficients of the objective function.

The pivot elements are chosen based on a selection rule, and the algorithm performs row operations to update the tableau. The iterations continue until no further improvement is possible, at which point an optimal solution is found. The table is defined as $$T = \begin{pmatrix} C & b \\ f^T & y \end{pmatrix}$$

of dimension $(m+1)\times(n+1)$ where $y=f(x)$ with subject to $Cx\leq b$.

Accordingly, with this technology, an optimized process for using a privacy preserving linear optimization technique to perform computations on encrypted data while ensuring that the original data remains confidential and secure from any unauthorized access based on secure multi-party computation is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for using a privacy preserving linear optimization technique to perform computations on encrypted data while ensuring that original data remains confidential and secure from unauthorized access, the method being implemented by at least one processor, the method comprising:

establishing, by the at least one processor and via a network, a joint optimization session with a plurality of entities, wherein the each of the plurality of entities are external entities with respect to one another and resides on a differing network;

receiving, by the at least one processor from the plurality of entities, respective inputs, wherein each of the respective inputs includes first encrypted data, and wherein encryption performed on the first encrypted data is performed by each of the respective entity among the plurality of entities for limiting exposure of underlying data of the first encrypted data to other entities among the plurality of entities;

constructing, by the at least one processor and using the respective inputs received from the plurality of entities, a first table that includes first information that relates to a first predetermined objective function, second information that relates to a first predetermined boundary value, and third information that relates to a predetermined polynomial function that is applicable to each respective input among the respective inputs received;

performing a plurality of iterations for each of the respective inputs, wherein each of the plurality of iterations include:

determining, by the at least one processor, a pivot column of the first table based on the received respective inputs;

determining, by the at least one processor, a pivot row of the first table based on the received respective inputs and the pivot column;

updating, by the at least one processor, the pivot row by performing a first predetermined operation that is based on the predetermined polynomial function and the first predetermined boundary value; and updating, by the at least one processor, each respective column of the first table by performing a second predetermined operation that is based on the predetermined polynomial function, the first predetermined boundary value, and the updated pivot row; and determining, by the at least one processor and based on performing the plurality of iterations for each respective input, a first value that maximizes the predetermined polynomial function while satisfying a constraint that a result of applying the first predetermined objective function to the first value is less than or equal to the first predetermined boundary value, wherein underlying data of the first value remain unexposed to the plurality of entities for reducing gross exposure to the plurality of entities.

2. The method of claim 1, wherein the determining of the pivot column comprises:

applying a predetermined minimum element function to each respective column of the first table;

computing a most significant bit of a respective vector that corresponds to each respective column of the first table;

reconstructing an encrypted value with respect to the most significant bit; and determining the pivot column based on a result of the reconstructing of the encrypted value.

3. The method of claim 1, wherein the determining of the pivot row comprises:

retrieving elements of the pivot column;

constructing a vector of tuples based on the elements of the pivot column;

applying a predetermined positive minimum function to the vector of tuples; and determining the pivot row based on a result of the applying of the predetermined positive minimum function to the vector of tuples.

4. The method of claim 1, wherein the first predetermined operation includes a predetermined table-set function that updates respective elements from the first table on an element-by-element basis.

5. The method of claim 4, wherein the second predetermined operation includes the predetermined table-set function and a predetermined truncation function that truncates an authenticated sharing of each respective input by a predetermined number of bits.

6. The method of claim 1, wherein each respective entity corresponds to a financial portfolio that is associated with a respective client.

7. The method of claim 6, further comprising calculating a market netting metric that relates to a respective degree of risk to a privacy associated with each respective financial portfolio.

8. The method of claim 7, wherein the market netting metric includes at least one from among a first metric that relates to an allocation of exposure of each respective entity, a second metric that relates to an amount of funds that are required with respect to at least one entity from among the plurality of entities, and a third metric that relates to a number of shares associated with at least one entity from among the plurality of entities.

9. A computing apparatus for using a privacy preserving linear optimization technique to perform computations on encrypted data while ensuring that original data remains confidential and secure from unauthorized access, the computing apparatus comprising:

a processor;

a memory; and a communication interface coupled to each of the processor and the memory, wherein the processor is configured to:

establish, via a network, a joint optimization session with a plurality of entities, wherein the each of the plurality of entities are external entities with respect to one another and resides on a differing network;

receive, via the communication interface from each respective entity from among the plurality of entities, a respective input that includes first encrypted data, wherein encryption performed on the first encrypted data is performed by each of the respective entity among the plurality of entities for limiting exposure of underlying data of the first encrypted data to other entities among the plurality of entities;

construct, using the respective input from each respective entity among the plurality of entities, a first table that includes first information that relates to a first predetermined objective function, second information that relates to a first predetermined boundary value, and third information that relates to a predetermined polynomial function that is applicable to each respective input;

perform a plurality of iterations for each respective input, wherein each of the plurality of iterations include:

determining a pivot column of the first table based on the received respective inputs;

determining a pivot row of the first table based on the received respective inputs and the pivot column;

updating the pivot row by performing a first predetermined operation that is based on the first predetermined polynomial function and the first predetermined boundary value; and updating each respective column of the first table by performing a second predetermined operation that is based on the first predetermined polynomial function, the first predetermined boundary value, and the updated pivot row;

determine, based on performing the plurality of iterations for each respective input, a first value that maximizes the predetermined polynomial function while satisfying a constraint that a result of applying the first predetermined objective function to the first value is less than or equal to the first predetermined boundary value, wherein underlying data of the first value remain unexposed to the plurality of entities for reducing gross exposure to the plurality of entities.

10. The computing apparatus of claim 9, wherein the processor is further configured to determine the pivot column by:

applying a predetermined minimum element function to each respective column of the first table;

computing a most significant bit of a respective vector that corresponds to each respective column of the first table;

reconstructing an encrypted value with respect to the most significant bit; and determining the pivot column based on a result of the reconstruction of the encrypted value.

11. The computing apparatus of claim 9, wherein the processor is further configured to determine the pivot row by:

retrieving elements of the pivot column;

constructing a vector of tuples based on the elements of the pivot column;

applying a predetermined positive minimum function to the vector of tuples; and determining the pivot row based on a result of the applying of the predetermined positive minimum function to the vector of tuples.

12. The computing apparatus of claim 9, wherein the first predetermined operation includes a predetermined table-set function that updates respective elements from the first table on an element-by-element basis.

13. The computing apparatus of claim 12, wherein the second predetermined operation includes the predetermined table-set function and a predetermined truncation function that truncates an authenticated sharing of each respective input by a predetermined number of bits.

14. The computing apparatus of claim 9, wherein each respective entity corresponds to a financial portfolio that is associated with a respective client.

15. The computing apparatus of claim 14, wherein the processor is further configured to calculate a market netting metric that relates to a respective degree of risk to a privacy associated with each respective financial portfolio.

16. The computing apparatus of claim 15, wherein the market netting metric includes at least one from among a first metric that relates to an allocation of exposure of each respective entity, a second metric that relates to an amount of funds that are required with respect to at least one entity from among the plurality of entities, and a third metric that relates to a number of shares associated with at least one entity from among the plurality of entities.

17. A non-transitory computer readable storage medium storing instructions for using a privacy preserving linear optimization technique to perform computations on encrypted data while ensuring that original data remains confidential and secure from unauthorized access, the storage medium comprising executable code which, when executed by a processor, causes the processor to:

establish, via a network, a joint optimization session with a plurality of entities, wherein the each of the plurality of entities are external entities with respect to one another and resides on a differing network;

receive, from each respective entity from among the plurality of entities, a respective input that includes first encrypted data, wherein encryption performed on the first encrypted data is performed by each of the respective entity among the plurality of entities for limiting exposure of underlying data of the first encrypted data to other entities among the plurality of entities;

construct, using the respective input from each respective entity among the plurality of entities, a first table that includes first information that relates to a first predetermined objective function, second information that relates to a first predetermined boundary value, and third information that relates to a predetermined polynomial function that is applicable to each respective input;

perform a plurality of iterations for each respective input, wherein each of the plurality of iterations include:

determining a pivot column of the first table based on the received respective inputs;

determining a pivot row of the first table based on the received respective inputs and the pivot column;

updating the pivot row by performing a first predetermined operation that is based on the first predetermined polynomial function and the first predetermined boundary value; and updating each respective column of the first table by performing a second predetermined operation that is based on the first predetermined polynomial function, the first predetermined boundary value, and the updated pivot row;

determine, based on performing the plurality of iterations for each respective input, a first value that maximizes the predetermined polynomial function while satisfying a constraint that a result of applying the first predetermined objective function to the first value is less than or equal to the first predetermined boundary value, wherein underlying data of the first value remain unexposed to the plurality of entities for reducing gross exposure to the plurality of entities.

\* \* \* \* \*